(12) United States Patent
Borghei et al.

(10) Patent No.: US 12,191,649 B2
(45) Date of Patent: Jan. 7, 2025

(54) COMPACT HIGH VOLTAGE ELECTRIC FEEDTHROUGH

(71) Applicant: AVALANCHE ENERGY DESIGNS INC., Tukwila, WA (US)

(72) Inventors: Moein Borghei, Tukwila, WA (US); Robert McMullen, Tukwila, WA (US); Robin Langtry, Tukwila, WA (US); Brian Riordan, Tukwila, WA (US)

(73) Assignee: Avalanche Energy Designs Inc., Seattle, WA (US)

( * ) Notice: Subject to any disclaimer, the term of this patent is extended or adjusted under 35 U.S.C. 154(b) by 0 days.

(21) Appl. No.: 18/701,146

(22) PCT Filed: Aug. 10, 2023

(86) PCT No.: PCT/US2023/071997
§ 371 (c)(1),
(2) Date: Apr. 12, 2024

(87) PCT Pub. No.: WO2024/036260
PCT Pub. Date: Feb. 15, 2024

(65) Prior Publication Data
US 2024/0332935 A1    Oct. 3, 2024

Related U.S. Application Data

(60) Provisional application No. 63/396,878, filed on Aug. 10, 2022.

(51) Int. Cl.
H02G 3/22    (2006.01)

(52) U.S. Cl.
CPC ................... *H02G 3/22* (2013.01)

(58) Field of Classification Search
CPC ....................................... H02G 3/22
See application file for complete search history.

(56) References Cited

U.S. PATENT DOCUMENTS

| | | | |
|---|---|---|---|
| 2,903,504 A * | 9/1959 | Tuck | H01R 13/502 |
| | | | 174/152 R |
| 3,734,995 A | 5/1973 | Thomas | |
| 4,154,302 A * | 5/1979 | Cugini | E21B 17/003 |
| | | | 166/88.1 |
| 6,628,024 B1 | 9/2003 | Mirmobin | |
| 9,759,532 B2 * | 9/2017 | Hartl | F42B 3/198 |
| 2016/0049781 A1 | 2/2016 | Nisslbeck et al. | |

(Continued)

OTHER PUBLICATIONS

Written Opinion of the International Searching Authority mailed Dec. 18, 2023, issued in corresponding International Application No. PCT/US2023/071997, filed Aug. 10, 2023, 4 pages.

(Continued)

*Primary Examiner* — William H. Mayo, III
*Assistant Examiner* — Rhadames Alonzo Miller
(74) *Attorney, Agent, or Firm* — Christensen O'Connor Johnson Kindness PLLC (57) ABSTRACT

Systems, components, and methods for feeding high voltage into a vacuum chamber are provided. An exemplary feedthrough includes a dielectric flange defining a first side, a second side, and an aperture extending from the first side to the second side and a conductor disposed through the aperture and forming a contact with the dielectric flange on the first side.

28 Claims, 8 Drawing Sheets

(56) References Cited

U.S. PATENT DOCUMENTS

2018/0205208 A1* 7/2018 Leutenegger ........ H02G 15/025
2019/0006066 A1* 1/2019 Suttner ................ H01B 17/306

OTHER PUBLICATIONS

International Search Report mailed Dec. 18, 2023, issued in corresponding International Application No. PCT/US2023/071997, filed Aug. 10, 2023, 3 pages.

* cited by examiner

COMPACT HIGH VOLTAGE ELECTRIC FEEDTHROUGH

CROSS-REFERENCES TO RELATED APPLICATIONS

This application is a National Stage of International Application No. PCT/US2023/071997, filed Aug. 10, 2023, which claims the benefit of U.S. Provisional Application Ser. No. 63/396,878, filed Aug. 10, 2022, the disclosure of each of which is expressly incorporated herein by reference in its entirety.

BACKGROUND

Growing energy demand and global climate change urge the increase in the share of sustainable energy sources. Fusion energy has the potential to provide a zero-carbon, low-waste energy source that revolutionizes the energy industry. A gram of hydrogen isotope as fusion fuel can provide energy equal to burning 16 $m^3$ of coal.

In fusion reactions, light elements (like hydrogen) are energized to a point that their nuclei can fuse. The output of the reaction is a relatively heavier nuclei and energy. So far, several methods have been proposed to generate fusion power, each of which have failed to operate at a net positive energy output (e.g., a Q factor greater than one). Thermonuclear fusion technologies include the Tokamak configuration in which a torus contains a thermal plasma confined by strong, external magnetic fields, of which International Thermonuclear Experimental Reactor (ITER), based in France, is an example. The goal of the ITER collaboration is to prove that positive net fusion power is technologically feasible. It is projected that the 50 MW input power can produce 500 MW of power for 6 to 10 minutes. The seven-party collaboration is projected to cost at least $22 Billion. There is a need, therefore, for compact fusion reactors that can be built and deployed quickly, for example to remote areas or in space-based platforms, to meet lower power demands with shorter lead times.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

As will be described in more detail below, the present disclosure provides examples of compact bushings and other components compatible for use in vacuum systems (e.g., ultra-high vacuum) incorporating insulating or dielectric materials. The insulating or dielectric materials can be structured to reduce the likelihood of surface flashover when operating at high voltages on the order of hundreds of kilovolts. The structure of the dielectric materials on a vacuum side, also referred to as a first side, is configured to reduce the number and energy of electrons emitted from a conductor into the vacuum (e.g., by field emission) and to reduce the number and energy of secondary electrons that are remitted from the surface of the dielectric as a result of electron impact.

As described in more detail in reference to the exemplary embodiment of Example 1, embodiments of the present disclosure are directed at compact fusion systems. It is contemplated, however, that the structures, components, and systems described herein are similarly applicable to other low-pressure systems. For example, systems incorporating dielectric bushings can include power systems such as high-voltage feedthroughs, optical feedthroughs, or the like, whereby the interactions of radiation, electricity, or other forms of energy can generate electrons in a vacuum and induce a breakdown or other electronic phenomena. While discussion herein focuses on a high-voltage feedthrough to introduce a field-emission electron source within a vacuum environment, embodiments of the present disclosure can omit the conductive feedthrough to provide a vacuum-tight insulating or dielectric flange, bushing, standoff, or the like, to electrically isolate components of a vacuum system.

Advantageously, the compact components of the present disclosure represent an improvement over the current state of the art in high-voltage vacuum system components. For example, compact feedthroughs of the present disclosure are structured to introduce a conductor that is compatible with high-voltage, low-pressure, operation while also being structured to operate at voltages as much as or exceeding ±600 kVDC with little or no stable dark current, and with negligible or no likelihood of surface flashover (e.g., electron avalanche and ionization across the dielectric) when operating at vacuum pressures as low as $10^{-8}$ torr, or lower.

Figure 1:
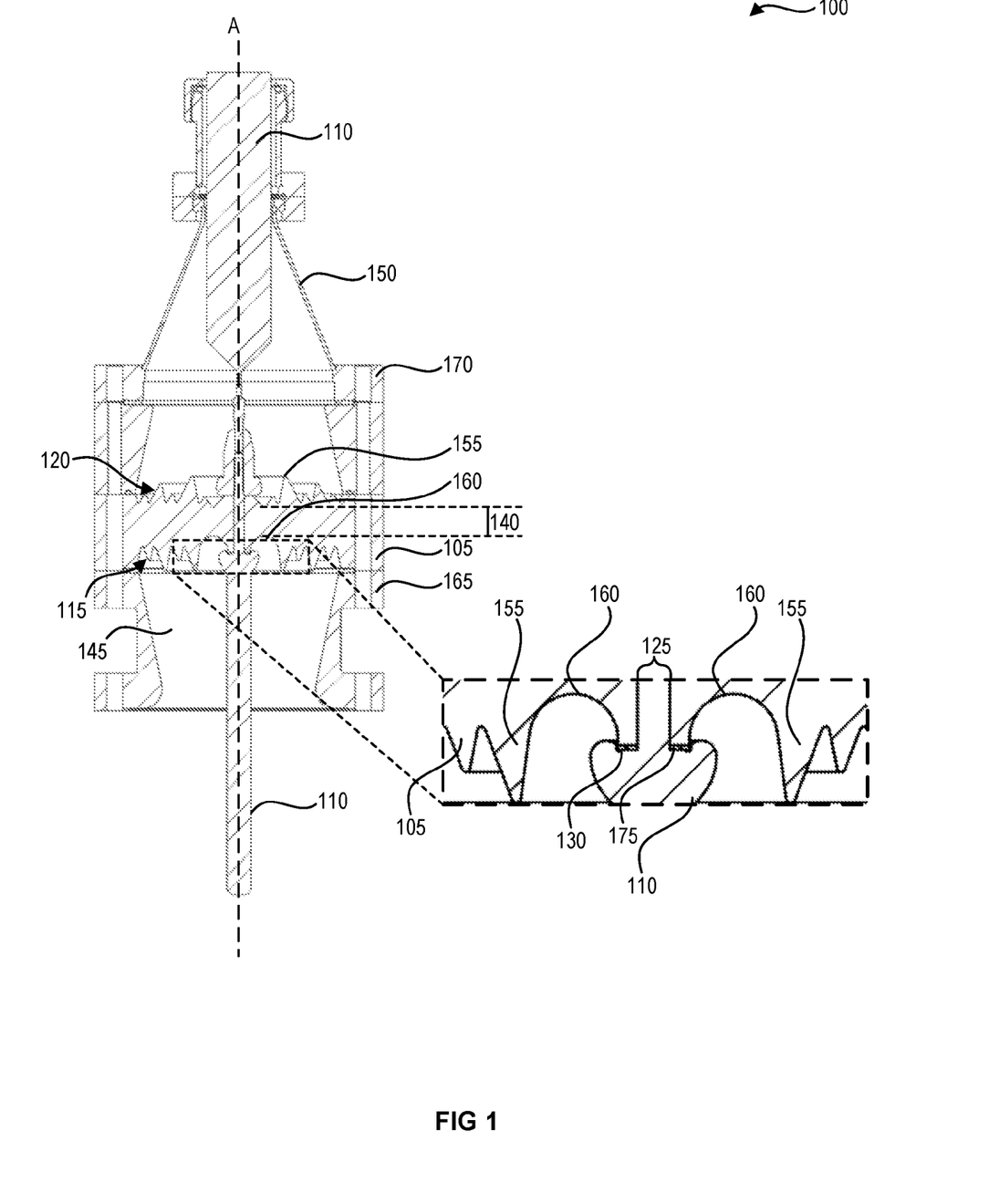
FIG. 1 is a schematic diagram of a compact feedthrough configured for an operating voltage of about ±300 kVDC, in accordance with embodiments of the present disclosure.

FIG. 1 is a schematic diagram of an example compact feedthrough 100 configured for an operating voltage of about ±300 kVDC, in accordance with embodiments of the present disclosure. The example compact feedthrough 100 includes a dielectric flange 105 and a conductor 110. The dielectric flange 105 can define a first side 115, a second side 120, and an aperture 125 extending from the first side 115 to the second side 120. The conductor 110 can be disposed through the aperture 125, thereby forming a contact 130 with the dielectric flange on the first side.

In some embodiments, the dielectric flange 105 is a solid of rotation, symmetrical about a central axis, "A." The aperture 125 can be concentric with the central axis A, or can be off-axis relative to the central axis A. For example, the dielectric flange 105 can be fabricated by subtractive manufacturing after which the aperture 125 can be removed. In some embodiments, the dielectric flange 105 can be fabricated by additive manufacturing, or by multiple steps that include additive manufacturing and subtractive manufacturing (e.g., laser fusing of a ceramic powder followed subtractive refining of the structure by deburring, polishing, etc.).

In some embodiments, the dielectric flange 105 is characterized by a minimum nondimensional thickness from about 0.1 to about 2.0, expressed as a ratio of a width of the dielectric flange. As described in more detail in reference to FIGS. 3A-3C, the dielectric flange 105 can include multiple surface features 155 and/or recesses 160, such that the dielectric flange 105 is characterized by a positionally-dependent local thickness. As a structure configured to withstand a relative pressure difference between a vacuum environment 145 and an ambient environment 150, the minimum nondimensional thickness 140 of the dielectric flange 105 can be determined based at least in part on the width of the dielectric flange 105, at least in part because the force exerted on the dielectric flange 105 is proportional to the cross-sectional area of the dielectric flange 105. In some embodiments, the minimum nondimensional thickness 140 is from about 0.1 to about 1.9, from about 0.1 to about 1.8, from about 0.1 to about 1.7, from about 0.1 to about 1.6, from about 0.1 to about 1.5, from about 0.1 to about 1.4, from about 0.1 to about 1.3, from about 0.1 to about 1.2, from about 0.1 to about 1.1, from about 0.1 to about 1.0, from about 0.1 to about 0.9, from about 0.1 to about 0.8, from about 0.1 to about 0.7, from about 0.1 to about 0.6, from about 0.1 to about 0.5, from about 0.1 to about 0.4, from about 0.1 to about 0.3, from about 0.1 to about 0.2, including fractions and interpolations thereof. In this context, the term "about" refers to a deviation from the stated value of equal to or less than 5%. In this context, the term "minimum" does not refer to the lowest possible value (e.g., a mechanically optimized or minimized thickness determined, for example, based on physical simulation), but rather refers to the shortest distance between the first side 115 and the second side 120 measured over the structure of the dielectric flange 105.

The example compact feedthrough 100 can be removably attached to a vacuum chamber 165 configured to be evacuated to a given pressure (e.g., low "rough" vacuum above 1 torr, medium vacuum between 1 torr and $10^{-3}$ torr, high vacuum and ultra-high vacuum below $10^{-3}$ torr, etc.). In some embodiments, the dielectric flange 105 is removably attached to the vacuum chamber 165 using a gasket (e.g., a butadiene rubber, copper, ceramic, or other material) that is compressed between two flange faces, between a knife edge disposed on the first side 115 and a knife edge disposed on an opposing face of the vacuum chamber 165, or the like. In some embodiments, the dielectric flange 105 is removably attached to a metal standoff that is in turn attached to the vacuum chamber 165. In some embodiments, the dielectric flange 105 is incorporated into the vacuum chamber 165 directly. For example, the vacuum chamber 165 can be formed from a ceramic material, such that the aperture 125, features 155, and/or recess(es) 160 can be formed in the material of the vacuum chamber 165 itself. In some embodiments, the example compact feedthrough 100 forms a part of a reactor system that includes a high voltage power supply electrically coupled with the conductor. The high voltage power supply can be electrically coupled to the conductor by a resistive medium integrated into the conductor or in series with the conductor. In these embodiments, the resistive medium can be a cable with a resistive core, a resistor, or the like.

In some embodiments, at least a portion of the conductor 110 is contained within a secondary chamber 170 that can be removably attached to the second side 120 of the dielectric flange 205. As described in more detail in reference to the exemplary embodiment of Example 1, proximal to the second side 120, the conductor 110 can be disposed in an oil (e.g., transformer oil) environment within the secondary chamber 170. The environment can include liquids or gases. In an illustrative example, the environment can include $SF_6$, $C_3F_7CN$, alone or in a combination with one or more gases (e.g., 30% $C_3F_7CN$/70% $CO_2$). Advantageously, providing an insulating medium with a higher density in contact with the conductor can reduce the formation of corona discharges near the second side 120, thereby improving performance of the feedthrough at voltages at or above which corona discharges typically form in air.

In some embodiments, the dielectric flange 105 includes an insulating or dielectric material. For example, the dielectric flange 105 can be formed from or include MACOR®, SHAPAL®, aluminum oxide, zirconium dioxide, aluminum nitride, boron nitride, quartz, mica, borosilicate glass, or the like, or any other vacuum compatible solid dielectric material. In some embodiments, a coating of non-conductive or semi-conductive material is disposed overlying the first side 115 of the dielectric flange 105. The coating can be the by a secondary electron emission coefficient lower than that of dielectric or preferably less than one. In this context, the secondary electron emission coefficient describes a number of secondary electrons that are emitted from the material of the coating in response to incidence of an electron onto a surface of the coating. A secondary electron emission coefficient less than one, therefore, describes a material that is a net absorber of electrons, while a secondary electron emission coefficient greater than one describes a material that multiplies the number of free electrons near the first side 115. As described in reference to Example 1, below; the likelihood of surface flashover is influenced by the number (e.g., density) of free electrons near the surface of the first side 115. In this way, reducing the density of secondary electrons near the surface of the first side 115 can reduce the likelihood of surface flashover when the example feedthrough 100 is operating.

In some embodiments, compact feedthrough 100 can include a magnetic field to urge electron paths away from the surface of the insulator. In this regard, the magnetic field can be applied to the electrons in a direction perpendicular to the path of at least some of the electrons traveling between the conductor 110 and the wall of the vacuum chamber 165, which in some cases can be a relative anode (e.g., when the conductor 110 is energized). The magnetic field can be applied with a solenoid or other magnetic source and oriented in an axial direction of the conductor 110 (e.g., with the magnetic source creating a magnetic field in the upward direction relative to FIG. 1) such that the cross product of the electric field and the magnetic field is a vector perpendicular to both the electric and magnetic fields, causing a spiral movement of the electrons within the vacuum chamber 165.

The magnetic field can be created by a suitable magnetic source, including electromagnetic coils, permanent magnets, superconducting magnets (e.g., LK99 room-temperature superconducting magnets), or the like.

The spiral movement of the electrons (e.g., whether the electrons move radially outward, radially inward, or remain substantially radially static during spiral movement) can be controlled by the strength of the magnetic field, with the substantially radially static condition being described in view of a condition in accelerator physics referred to as Hull cut-off. When charged particles, such as protons or electrons, are accelerated in a magnetic field, they follow a spiral trajectory, and these particles can remain in phase with the oscillating electric field responsible for their acceleration. The Hull cut-off condition defines the maximum magnetic field strength at which a cyclotron can accelerate particles of a given charge-to-mass ratio. If the magnetic field is too strong (beyond the Hull cutoff), then the particles will not remain in phase with the oscillating electric field, making the acceleration process inefficient.

The Hull cut-off condition for a coaxial electrode configuration can be represented by the following equation, which gives the minimum magnetic field that is required to prevent an electron from reaching the anode:

$$B_c = \sqrt{\frac{8V_0 m}{eb^2} \frac{1}{\left(1-\left(\frac{a}{b}\right)^2\right)^2}}$$

Where a and b are the cathode (inner cylinder) and the anode (outer cylinder) radius, e is the elementary charge of electron, m is the mass of electron, and $V_0$ is the applied voltage between the two electrodes.

Figure 2:
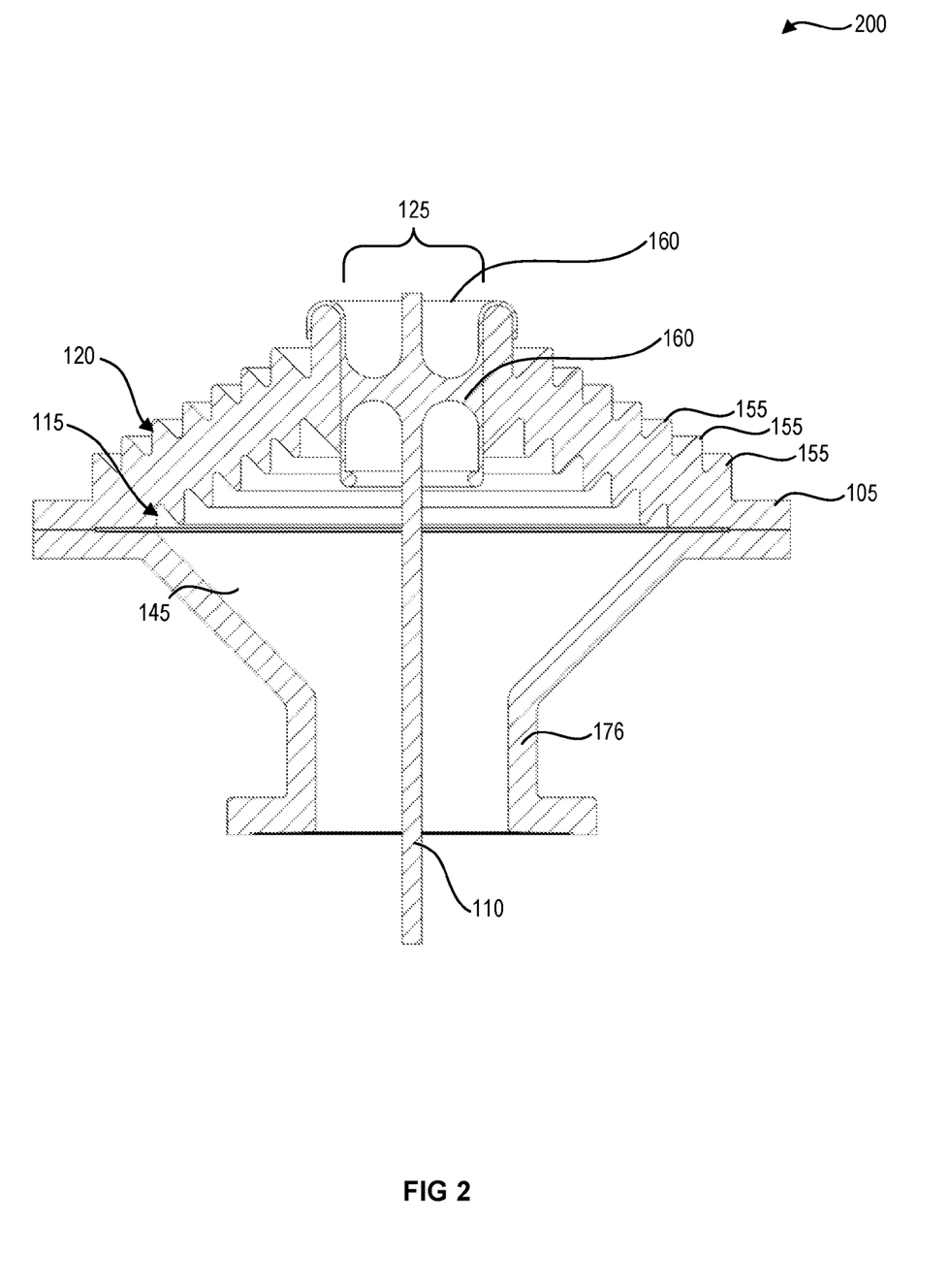
FIG. 2 is a schematic diagram of a compact feedthrough configured for an operating voltage of about ±600 KVDC, in accordance with embodiments of the present disclosure.

FIG. 2 is a schematic diagram of an example compact feedthrough 200 configured for an operating voltage of about ±600 kVDC, in accordance with embodiments of the present disclosure. Example compact feedthrough 200 is an example of example compact feedthrough 100 of FIG. 1, for which the structure is configured for operating at voltages up to about ±600 kVDC or more, while exhibiting little or no stable dark current and reduced likelihood of surface flashover when operating. As with example compact feedthrough 100, example compact feedthrough 200 includes the dielectric flange 105, defining a first side 115, a second side 120, and an aperture 125. The first side 115 and/or the second side 120 can defined multiple features 155, illustrated as concentric ridges symmetric about the aperture 125. In some embodiments, the conductor 110 of example compact feedthrough 200 can be or include a purified metal configured to generate an electric field in the vacuum chamber 165 during operation (e.g., at an applied voltage of up to about ±600 kVDC). For example, the conductor 110 can be or include a conductive material characterized by a purity of about 50%, about 55%, about 60%, about 65%, about 70%, about 75%, about 80%, about 85%, about 90%, about 95%, about 99% or greater, including fractions or interpolations thereof. The conductor 110 can be or include molybdenum, titanium, stainless steel, niobium, copper, tungsten, aluminum, nickel, tantalum, or a composite and/or alloy thereof. In some embodiments, the conductor 110 can be formed from any vacuum compatible electrode material.

In some embodiments, the dielectric flange 105 includes aluminum oxide, zirconium dioxide, aluminum nitride, MACOR®, SHAPAL®, boron nitride, quartz, mica, or borosilicate glass, at a purity of about 50%, about 55%, about 60%, about 65%, about 70%, about 75%, about 80%, about 85%, about 90%, about 95%, about 99% or greater, including fractions or interpolations thereof. The material of the dielectric flange can be characterized by a purity above a given value, such that the material does not transition from a dielectric to a conductor above a given threshold electric field strength (e.g., above 15 kV/mm), in that the threshold field strength can be purity dependent, for example, being modulated by doping or by refining the material to a higher purity.

In some embodiments, example compact feedthrough 200 is removably attached to the vacuum chamber 165 using a dielectric standoff 176. The dielectric standoff can be coated with a non-conductive or semi-conductive material characterized by a secondary electron emission coefficient less than one. As with the first side 115, a net electron absorber coating can improve performance of the electric feedthrough by reducing the likelihood of surface flashover that results from local increase of electron density in the vacuum environment surrounding the conductor 110 near the surface of the dielectric standoff 176.

Figure 3A:
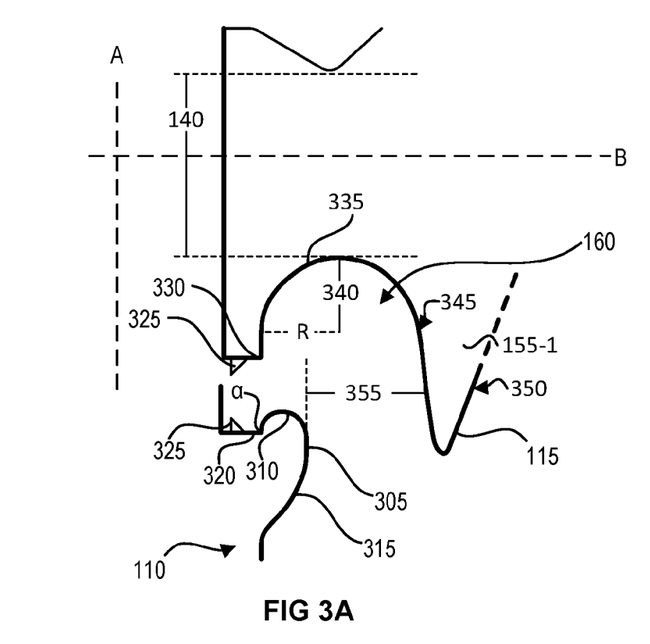
FIGS. 3A-3D are schematic diagrams of sections of the compact feedthroughs of FIGS. 1 and 2.
Figure 3B:
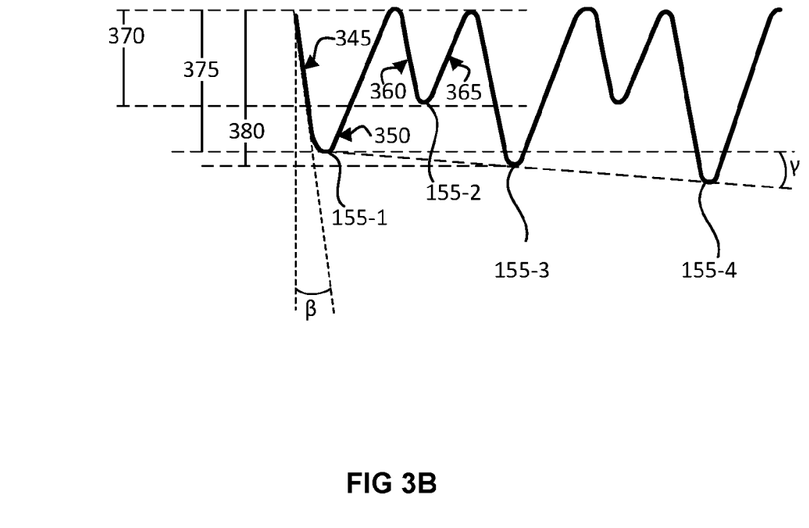
Figure 3C:
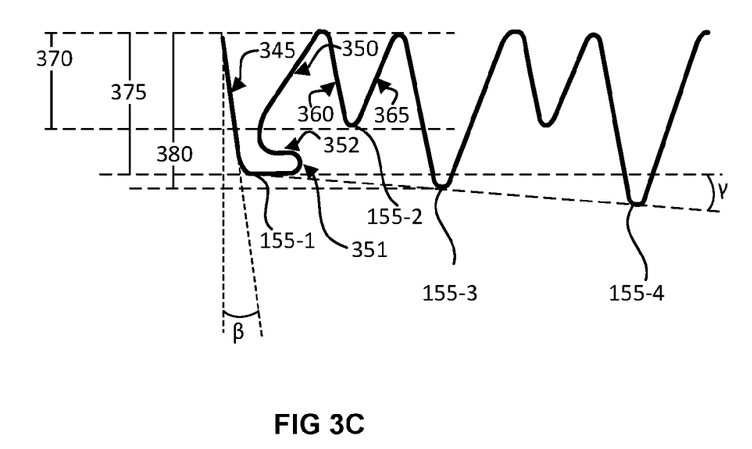
Figure 3D:
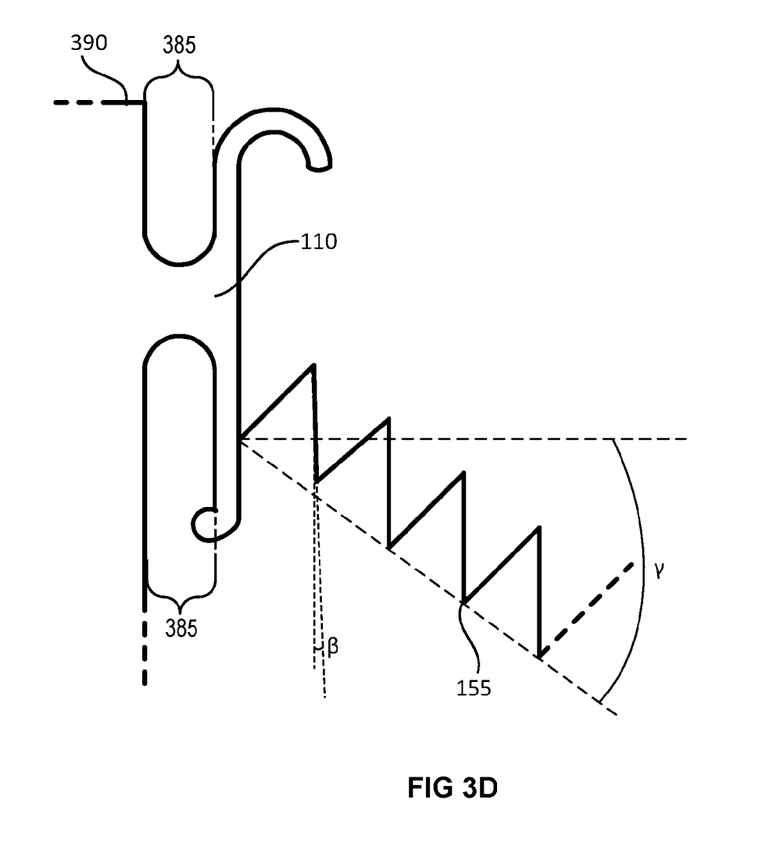

FIGS. 3A-3C are schematic diagrams of sections of the compact feedthroughs 100 and 200 of FIGS. 1 and 2, in accordance with embodiments of the present disclosure. The schematic diagrams of FIGS. 3A-3D illustrate exemplary cross sections that are intended to focus description of structural elements of the dielectric flange 105 and the conductor 110, as described in more detail in reference to FIGS. 1 and 2, from which the various improvements and functionality of the example compact feedthroughs 100 and 200 are derived. For example, FIG. 3A illustrates a portion of a cross section of the example compact feedthrough 100 of FIG. 1, focusing description on the triple junction point (TJP) of the first side 115 of the dielectric flange 105 and the conductor. FIGS. 3B and 3C illustrate regions of the first side 115 including multiple features 155, the structures of which are configured to attenuate electron current between the conductor 110 and the vacuum chamber 165. FIG. 3D illustrates a corresponding region of the example compact feedthrough 200 of FIG. 2, including the conductor 110 and the first side 115 of the dielectric flange 105.

As described in more detail in reference to FIG. 1, the conductor 110 can be or include a solid of revolution having a cross-section that is rotationally symmetric about an axis of rotation and defined in part by a compound curve 305. The compound curve 305 can include a first curved segment 310 having a first radius of curvature. The compound curve 305 can also include a second curved segment 315 of a second radius of curvature greater than the first radius of the first curved segment. In some embodiments, the second radius of curvature is also equal to or less than about 20 mm, about 19 mm, about 17 mm, about 16 mm, about 15 mm, about 14 mm, about 13 mm, about 12 mm, about 10 mm, about 09 mm, about 08 mm, about 07 mm, about 06 mm, or about 05 mm, including fractions and interpolations thereof. In further embodiments, the first radius of curvature of the first curved segment 310 is equal to the second radius of curvature of the second curved segment 315.

As illustrated, the first curved segment 310 can be nearer to the first side 115 and the second curved segment 315 can be farther from the first side. In some embodiments, the compound curve 305 includes a third segment 320, with the first curved segment 310 being between the third segment 320 and the second curved segment 315. The third segment 320 can be shaped to receive the dielectric flange 105 at the first side 115 and to form a contact between the first side 115 and the third segment 320. In some embodiments, the third segment 320 and/or the first side 115 include a knife edge 325. The knife edge(s) 325 can facilitate the formation of a vacuum tight seal at the contact, for example, by compression of a gasket 175 (e.g., a ring formed from copper, aluminum, flexible graphite, stainless steel, cast steel, monel, inconel, brass, bronze, or any combination thereof) between the first side 115 and the third segment 320. In some embodiments, the contact between the first side 115 and the conductor 110 can be formed by metallization of the dielectric flange in the region of the contact with vacuum braising of the two components together to form a hermetic seal.

As described in more detail in reference to Example 1, below, the structure of the conductor 110 and the dielectric flange 105 can impart functional improvements to the example compact feedthroughs 100 and 200 described herein. For example, the size and curvature of the compound curve 305 can reduce the likelihood of surface flashover as well as reduce the stable dark current exhibited during high-voltage operation. To that end, locations of high aspect ratio or surface asperity, such as defects in surface polish or machining artifacts, can locally concentrate electric fields and lead to an increased emission current from "hot-spots" on the surface of the conductor. As such the first radius of curvature of the first curved segment 310 can structure the TJP such that the contact between the dielectric flange 105 and the conductor 110 is screened from the features 155 of the first side 115 by the first curved segment 310, thereby reducing the local electric field around the TJP and reducing the electron emission current from the TJP. As the TJP is typically a point where the electric field is concentrated, screening or otherwise reducing the electric field strength in a region surrounding the TJP can reduce the likelihood of surface flashover at high-field strengths.

In some embodiments, the first radius of curvature can be from about 0.5 mm to about 10 mm. Where the first radius of curvature is smaller than about 0.5 mm, the compound curve 305 can concentrate the electric field at an apex of the first curved segment 310, thereby increasing the likelihood of field emission of electrons from conductor, which can increase the electron density near the surface of the first side 115. Above 8 mm, for example, the compound curve 305 can approach a distance from the vacuum chamber 165 that permits electrons to transit the distance (e.g., by tunneling), thereby increasing the stable dark current.

In some embodiments, the first curved segment 310 meets the third segment 320 at an angle "α." The angle α can be from about 15 degrees to about 345 degrees relative to a radial axis B of the dielectric flange normal to the axis of rotation A. The value of angle α influences the extent to which the electric field at the TJP is screened from the first side 115, such that an angle α of about 90 degrees corresponds to a line tangent to the first curved segment 310 being parallel with the axis of rotation A. Similarly, an angle α of about 0 or about 180 degrees corresponds with a line tangent to the first curved segment 310 being parallel with the radial axis B.

A cross section of the first side 115 can define a first segment 330, substantially normal to the axis of rotation B. The cross-section can also define an annular recess 335, concentric with the aperture 125. The annular recess 335 can be contiguous with the first segment 330. The annular recess 336 can be defined by an inner portion 340 with a semicircular cross-section of radius, "R." In terms of radius R, in some embodiments, the first radius of curvature can be from about 0.5 mm to about ½R mm.

The cross-section can define a first feature 115-1 that is contiguous with the annular recess 335. The first feature can include an inner surface 345 and an outer surface 350. The inner surface 345 can be nearer to the axis of rotation A than the outer surface 350. The inner surface 345 can be separated from the conductor 110 by a non-dimensional distance 355 from about 0.1 to about 1.0, defined as a ratio of a dimensional distance between the compound curve 305 and the inner surface 345, relative to the overall radius of the dielectric flange 105. Advantageously, defining a non-dimensional distance 355 relative to the overall dimensions of the dielectric flange 105 permits the annular recess 335 to be defined based at least in part on the overall dimensions of the dielectric flange 105, rather than by a predefined geometry. In this way, the example compact feedthroughs 100 and 200 can be scaled in reference to a single geometrical dimension, rather than by physical simulations. In addition, electronic phenomena can result from structural configurations of the electrodes and inner surfaces of the first side 115, such that simulations can determine a distance below which surface flashover is more likely. In contrast, a non-dimensional distance 355 above a given value can permit electrons that are emitted from the conductor to accelerate in the electric field emanating from the conductor, reaching a velocity at which the electrons are more likely to generate secondary electron reemission and increase the probability of surface flashover. As the rate of acceleration is dependent on the strength of the electric field, different operating parameters will affect the simulation of electron behavior differently. To that end, the non-dimensional distance 355 can be about 0.01 to about 1.0, about 0.1 to about 1.0, about 0.2 to about 1.0, about 0.3 to about 1.0, about 0.3 to about 0.9, about 0.3 to about 0.8, about 0.3 to about 0.7, about 0.3 to about 0.6, about 0.3 to about 0.5, about 0.3 to about 0.4, including fractions and interpolations thereof.

As illustrated in FIG. 1 and FIGS. 3B and 3C, the dielectric flange 105 can include multiple features 155 of different sizes, shapes, and orientations. Illustrated is an example portion of a cross-section of the dielectric flange 105, in accordance with embodiments of the present disclosure. The cross-section includes the first feature 155-1, a second feature 155-2, and a third feature 155-3. In FIG. 3B, the first feature 155-1 defines the inner surface 345 and outer surface 350. In FIG. 3C, the first feature 155-1 defines the inner surface 345 and the outer surface 350, and further defines a lateral projection 351, and an electron entrapment zone 352. The second feature 155-2 defines a second inner surface 360 and a second inner surface 365. The third feature 155-3 similarly defines an inner surface and outer surfaces. In some embodiments, the third feature 155-3 is farther from the axis of rotation A than the first feature 155-1.

While the features 155 of FIGS. 1-3D are generally illustrated as concentric ridges with a rounded or sharp triangular cross-section, it is contemplated that the features can be differently shaped. For example, FIG. 3C shows the first feature 155-1 having the lateral projection 351 and the electron entrapment zone 352. The electron entrapment zone 352 of the first feature 155-1 is oriented at least partially in the direction of the electric field. This orientation forces electrons traveling along the electron entrapment zone 352 to move in a direction opposite of the electrostatic force (e.g., to move against the electric field), which can be virtually impossible, trapping the electrons along the surface 352. In further embodiments, the features 155 can be shaped as concentric ridges with a rounded rectangular cross-section, with a polygonal cross-section, with a curvilinear cross-section (e.g., compound curves, scimitar curves, etc.), or the like. In an illustrative example, the features 155 can include one or more raised or proud surfaces, such as a concentric ridge including an inner stalk and an outer pedestal, such that a first region of a feature 155 nearer the radial axis B is narrower than a second region of the feature 155 that is farther from the radial axis B.

The first feature can be characterized by a first height 375 and the second feature can be characterized by a second height 370. In some embodiments, the second height 370 is smaller than the first height 375. In some embodiments, the second height 370 is larger than the first height 375. The third feature 155-3 can be characterized by a third height 380 that can be different from the first height 375 and the second height 370. In some embodiments, each feature 155 included as part of the first side 115 can be characterized by a different height, which can be a random height within a range of heights that permits the features 155 to impede electron trajectories between the conductor 110 and the vacuum chamber 165. The features 115 can be divided into two or more groups by height. For example, a first subset of features 115 can be characterized by the first height 375 and a second subset of features 115 can be characterized by the second height 370. In some embodiments, the height of a given feature 115 is proportional to the radial distance of the given feature 155 from the axis of rotation A. For example, a difference between the first height 375 and the third height 380 can define a nonzero angle "γ," relative to the radial axis B of the dielectric flange 105. In some embodiments, the angle γ can range from −75 degrees to 75 degrees. In an illustrative example, the dielectric flange 105 can further include a fourth feature 155-4, farther from the axis of rotation A than the third feature 155-3, the fourth feature 155-4 characterized by a height that is defined relative to the first height 375 and the third height 380 by the angle γ. Advantageously, progressively increasing feature height with increasing distance from axis A reduces the influence of field-acceleration of electrons between the conductor 110 and the vacuum chamber 165 by obstructing linear trajectories between compound curve 305 and/or the TJP and the vacuum chamber 165, which in some cases can be a relative anode (e.g., when the conductor 110 is energized).

To that end, one or more angles "β" can be defined by the inner surfaces of the features 155. The angle β can improve the performance of the dielectric flange 105 at reducing the likelihood of surface flashover at least in part in that an angle of the inner surface that provides for near-normal incidence can reduce secondary electron remission, for example, by shifting the interaction volume deeper into the dielectric material. In contrast, lower angles of incidence shift the interaction volume of electrons closer to the inner surface 345 and increase the likelihood that a secondary electron will escape the dielectric material. In this way, smaller values of beta, approaching alignment with the axis of rotation A, are generally more effective at absorbing incident field-emitted electrons originating from the conductor 110. In some cases, however, the angle β can be greater than zero for multiple reasons. For example, where the relative orientation of the compound curve 305 and the first feature 115-1 provides for a probable trajectory of emitted electrons that is not aligned with the radial axis B. Similarly, fabrication methods can limit the value of angle β to a nonzero value, in some embodiments, the inner surfaces 345, 360, and/or the inner surfaces of other features 155 can be oriented relative to the axis of rotation A at values of the angle β, from about 0 degrees to about 90 degrees, from about 0 degrees to about 75 degrees, from about 0 degrees to about 60 degrees, from about 0 degrees to about 45 degrees, from about 0 degrees to about 30 degrees, from about 0 degrees to about 15 degrees, from about 0 degrees to about 10 degrees, from about 0 degrees to about 5 degrees, including fractions and interpolations thereof.

Distinguished from the first height 375, second height 370, and third height 380, features 155-1, 155-2, and 155-3 can be characterized by respective inner lengths and outer lengths each corresponding to the surfaces of each feature 155. In this way, the overall shape of features 155 can be described by radial surface lengths of the inner and outer surfaces, analogous to a path travelled along the surface of the dielectric flange 105 by an electron. In the example of a substantially triangular cross section of concentric ridge features (e.g., substantially triangular due to rounded unions of the inner surfaces and outer surfaces), the ratio of the lengths of each respective feature can define height or angle β. As a non-dimensional parameter, the ratio of inner and outer lengths can be used to scale features 115 for various sizes of example feedthroughs 100 and 200.

In some embodiments, a ratio of the lengths of the first inner surface 345 and the first outer surface 350 is from about 0.01 to about 3.0. In terms of geometry, the inner surface being shorter than the outer surface of a feature 155 provides for a smaller value of β, based at least in part on manufacturing limits on the relative orientation of inner and outer surfaces. In this way, a smaller value of the ratio improves electron absorption, but introduces a balance between the number of features 155 and the heights of the features 155. At larger heights, the ratio limits the number of features, while with a larger number of features, the space available for each feature is reduced and in turn limits the height. As such, the ratio of the lengths of the first inner surface 345 and the first outer surface 350 can be from about 0.01 to about 2.5, about 0.01 to about 2.0, about 0.01 to about 1.5, about 0.01 to about 1.0, about 0.01 to about 0.5, about 0.01 to about 0.1, or the like, including fractions and interpolations thereof.

FIG. 3D illustrates an example cross section of a dielectric flange 105 and conductor forming a triple junction point, as part of an example feedthrough 200 of FIG. 2. The example cross section omits features of the example feedthrough 200 to better illustrate the configuration of recesses 125 and concentric features 155 that together configure the example feedthrough 200 to operate at voltages up to and exceeding ±600 kVDC while exhibiting little or no likelihood of surface flashover and reduced or no stable dark current. As illustrated, angle γ can be greater than the value illustrated for the relatively lower voltage configuration of example feedthrough 100 of FIG. 1.

Advantageously, the larger angle increases the angular sweep between the conductor 110 and the vacuum chamber 165 that is obstructed by features 115, thereby further reducing the number of electrons that are likely to transit from the conductor to the vacuum chamber without impacting a feature 155. Similarly, the angle β is shown to be nonzero, but relatively smaller than the values illustrated in FIGS. 3A-3C. As with angle γ, the facing angle of the inner surfaces of the features 155 can be reduced to account for the higher average linear velocity of electrons based at least in part on stronger electric fields generated by the higher applied voltage. With increased electron velocity, the likelihood of secondary electron and/or backscatter electron generation increase and the average energy of secondary electrons/backscattered electrons can be higher, making the shape of the interaction volume in the features 155 important. As such, with increasing applied voltage, the value of β can be reduced. Similarly, with increases in applied voltage, the likelihood of secondary discharge formation (e.g., corona discharge) can increase on the second side 120 of the dielectric flange. In this way, the conductor 110 can incorporate one or more recesses 385 that provide a gap between a central element 390 to which a power supply coupling can be removably attached.

Example 1: Compact, 300-KVDC Bushing for Operation Under Ultra-High Vacuum Pressure The following is a description of an exemplary embodiment of a feedthrough of the present disclosure. Simulation results, schematic diagrams, and operating windows are intended to illustrate a non-limiting example of a feedthrough configured for operation at high voltage and low pressures with reduced dark current. Embodiments of the present disclosure include additional and/or alternative components, features, or operating parameters other than those described below.

INTRODUCTION

Growing energy demand and global climate change urge the increase in the share of sustainable energy sources. Fusion energy has the potential to provide a zero-carbon, low-waste energy source that revolutionizes the energy industry. A gram of hydrogen isotope as fusion fuel can provide energy equal to burning 16 $m^3$ of coal. In a novel approach to producing fusion energy, the Orbitron concept has been introduced in which ions are electrostatically confined around a high voltage (HV) cathode. Using this method, a cathode voltage, used as a source of electrons injected into a plasma for space-charge densification, can be on the order of ±100 kV. Transmission of high voltage from a power supply to ultra-high vacuum conditions (p<$10^{-8}$ torr) introduces challenges such as ionization/breakdown of gas atoms or molecules in the vacuum, as well as surface flashover across surfaces near a feedthrough used to pass current through a vacuum chamber. The exemplary embodiment described herein includes a compact, bushing configured to pass a current into a vacuum chamber at an applied voltage of about ±300-kV with a dark current of about 100 nA/$mm^2$ or less.

At present, oil and other fossil fuels are setting record prices and are exhibiting unprecedented volatility. This is happening at the same time that the world is in desperate need for a response to rising $CO_2$ levels. Since 1970, the global $CO_2$ emission level has increased by 90% with fossil fuels accounting for 78% carbon emissions. In the U.S., renewable energy consumption has approximately quadrupled since 1950. As of 2020, renewable energy represents 12% of total energy generation in the U.S. According to the United States Energy Information Administration (EIA), renewable energy production is expected to exceed 20 EJ in 2050, or less than 20% of forecasted total energy consumption.

Research on energy generation by fusion power began in earnest in 1938. In fusion reactions, light elements (like hydrogen) are energized to a point that their nuclei can fuse. The output of the reaction is a relatively heavier nuclei and energy. So far, several methods have been proposed to generate fusion power, each of which have failed to operate at a net positive energy output (e.g., a positive Q factor). Thermonuclear fusion technologies include the Tokamak configuration in which a torus contains a thermal plasma confined by strong, external magnetic fields, of which International Thermonuclear Experimental Reactor (ITER), based in France, is an example. The goal of the ITER collaboration is to prove that positive net fusion power is technologically feasible. It is projected that the 50 MW input power can produce 500 MW of power for 6 to 10 minutes. The seven-party collaboration is projected to cost at least $22 Billion.

There are at least a dozen more governmental and private companies that target the tokamak configuration, inertial confinement fusion, magnetized target fusion, field-reversed configuration, and stellarator configuration technologies. Embodiments of the present disclosure are addressed at systems for confining high-speed ions, referred to by the name "Orbitron," which includes relatively smaller magnets and does not use lasers to provide energy for fusion (as in z-pinch devices). Unlike other fusion configurations, Orbitron devices are configured for smaller footprints, to generate equal to or greater than 5 KW power that can be used as an energy source in electric vehicles, aircraft, and local or regional grids. In an Orbitron device, ions are co-confined by an electrostatic field and a relatively weak magnetic field perpendicular to the electrostatic field. In embodiments of the present disclosure, the plasma volume is relatively small and is sustained by electric fields generated by applied voltages on the order of ±100 kV.

The exemplary embodiment described herein describes feedthroughs configured to support applied voltages on the order of ±100 kV without dielectric breakdown to generate electric fields within a vacuum environment, as part of generating a fusion plasma in an Orbitron configuration. In some embodiments, a compact bushing is configured to transmit ±300 kV DC from atmospheric pressure to less than or equal to $10^{-8}$ torr. Advantageously, configurations described herein reduce surface flashover across the dielectric in a vacuum and occupy a relatively small volume of less than about 220 $in^3$. Validation of the configurations described herein were performed by electrostatic simulation of electric stress and particle trajectory for assessing the risk of surface flashover.

Design Considerations

Feedthrough bushings of the present disclosure are configured to transmit high voltage from a higher pressure ambient environment to a lower pressure vacuum environment. In this way, a system can be configured for sustaining a fusion plasma while addressing several constraints and technical challenges presented by the challenging operating conditions, including dielectric breakdown, vacuum arc formation, surface flashover, and elevated stable dark current.

Feedthroughs of the present disclosure can include a conductor material and a dielectric or insulating material. The dielectric strength of the insulator material can determine the thickness of insulator used to avoiding dielectric breakdown. Due to the operating conditions (p<1×$10^{-8}$ torr), the materials used in the bushing include ultra-high vacuum compatibility (e.g., structural and material properties such as low outgassing). Most plastic insulators such as polyvinyl chloride (PVC), polyetheretherketone (PEEK), and polyethylene (PE) are characterized by relatively high levels of outgassing that makes them unsuitable for operation at ultra-high vacuum. Ceramics including aluminum oxide, SHAPAL®, and MACOR® are characterized by relatively low outgassing rate and relatively high dielectric strength. In the present exemplary embodiment, feedthroughs include MACOR® for use in systems operating under electric field strengths of about 129 MV/m.

For direct current systems, discharge breakdown in the vacuum can be modeled using Paschen's law, which relates dimensions, such as electrode gap distance, and operating conditions, such as vacuum pressure and applied voltage. Under high-vacuum conditions (e.g., at 1×$10^{-8}$ torr) the mean free path of electrons is about λ≥5000 m. As a result, it is unlikely that a free electron will participate in an electron avalanche as part of discharge ignition.

On chamber and component surfaces exposed to electric fields, secondary electron emission can induce surface flashover (e.g., across an insulator surface), which can include dark current and ignition of a volumetric discharge in the volume. Surface flashover is influenced by surface conditions of dielectric and electrode components of the feedthrough bushings. Surface flashover can proceed by a three-step mechanism including: (1) field-emission of electrons from the electrode (e.g., at a triple-junction point), (2) secondary electron emission avalanche across the surface of the dielectric, and (3) Townsend ionization in the desorbed gas from the dielectric's surface.

Dark current refers to electron flux from an electrode unaccompanied by discharge ignition, as from field emission of electrons into the vacuum. Dark current can be a function of geometry, materials, and cathode surface area. Dark current is implicated in the first step of the surface flashover mechanism described above. Dark current drawn from a power supply can limit the output voltage of the power supply, increasing the power demand of the vacuum system to generate the same electric field strength in the vacuum. Higher current also increases a voltage drop across current-limiting resistors of the power supply circuit. In this way, an applied voltage may be significantly lower than the power supply output voltage.

The design of the compact feedthrough of the example embodiment is shown in FIG. 1. The size of the feedthrough is 6"×6"×6". As a result, electric field strength can be significant at the surface of the cathode. To reduce the likelihood of flashover, the cathode, and the dielectric flange, along with the ratio of the cathode to anode diameters, are configured to bring the field strength below a threshold for flashover at about ±300 VDC.

The dielectric flange acts as a spacer between two media: vacuum and oil at atmospheric pressure. The choice of oil as the insulating medium improves the electrical soundness of the cable-cathode junction. The sawtooth design at the surface of the insulator with uneven wedges traps the potential electrons that might be attacking the surface of the insulator.

As shown in FIG. 1, the cathode is not entirely a cylinder and comprises a hemispherical section on the vacuum side and a conical frustum on the oil side. The hemispherical portion of the cathode localizes the triple junction point (TJP) in an equipotential well and minimizes the electric field tension. The frustum is internally threaded to help seal the cathode-insulator interface at a 45° angle with the dielectric flange.

The anode is geometrically configured in terms of gap distance to reduce the generation of electrons due to field emission, as an approach to increasing the breakdown voltage in the gap above the operating voltage of the cathode. The cathode and anode are made of molybdenum and stainless steel, respectively. To reduce the emission of particles, both surfaces are polished to reduce the presence of surface asperities. The feedthrough was tested for breakdown and dark current measurement using a 300 kVDC power supply with a 15 MΩ current-limiting resistor. The measurements were performed using an ammeter with a high sampling rate.

The intensity of mechanical stress on the feedthrough during operation under vacuum, electrostatic simulations were completed. Additionally, particle trajectory analysis was integrated with electrostatic simulation to assess the probability of surface flashover. FIGS. 2 and 3 show the electric field and potential distribution in the central cut place of the bushing, respectively. The results presented in FIGS. 4 and 5 correspond to a voltage of −300 VDC applied to the cathode and a grounded anode.

Figure 4:
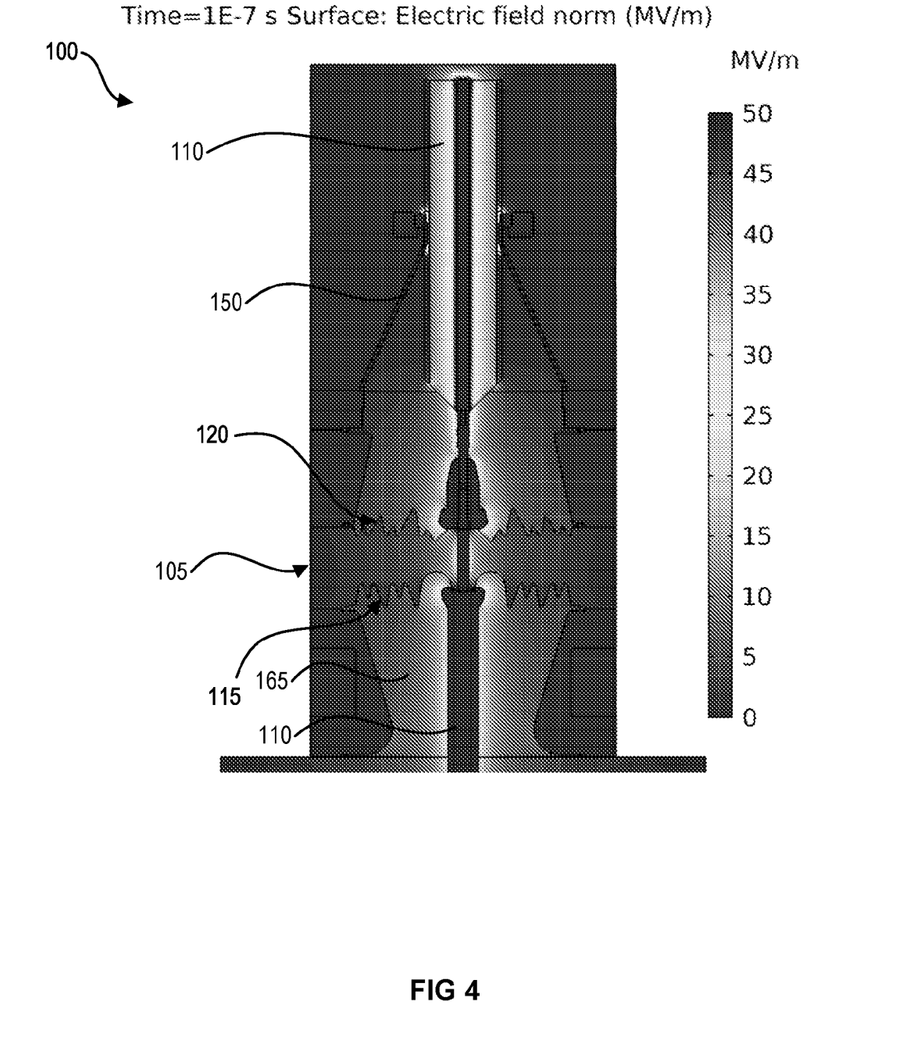
FIG. 4 is a schematic diagram illustrating a cross-sectional view of the feedthrough of FIG. 1 with an electric field distribution during operation at about +300 KVDC.
Figure 5:
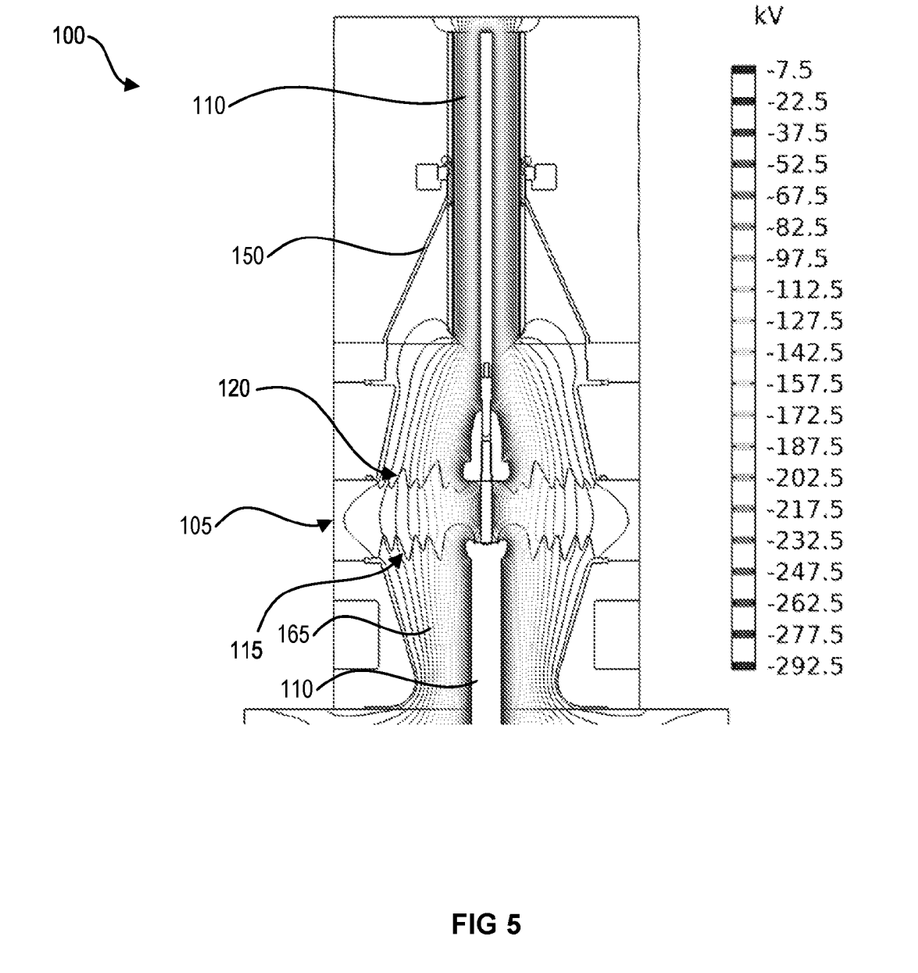
FIG. 5 is a schematic diagram illustrating a cross-sectional view of the feedthrough of FIG. 1 with an electric potential distribution during operation at about +300 kVDC.

The conductor and dielectric flange are structured to reduce and/or minimize electric field intensity at triple junction point (TJP). FIG. 4 demonstrates that a local maximum in the electric field of the example geometry does not occur at the TJP. Instead, the electric field is maintained below 20 MV/m at the TJP, which is attributed to the generation of an equipotential well around the TJP. In this way, the current field intensity at TJP does not lead to significant emission of electrons and reduces the likelihood of flashover resulting from electron flux. With respect to vacuum breakdown, a linear approximation of the Paschen law breakdown voltage gives a breakdown voltage of $>10^{10}$ MV for a 3.5 cm gap distance in air. It is estimated electric field is greatest, at about 41.7 MV/m at an outer surface of the cathode corresponding opposite the TJP. As a result of the structure of the dielectric flange, electrons emitted from the outer surface of the cathode are unable to reach the anode, further reducing the probability of surface flashover.

Particle Trajectory Analysis

To assess the likelihood of flashover in the feedthrough, particle trajectories were simulated for an extreme case of electron emission from the cathode surface. The simulation evaluated the trajectory of secondary electrons emitted from the insulator's surface. The number of electrons emitting from the cathode surface was regulated by a field-emission mechanism, for which the rate of electron emission follows the Fowler-Nordheim expression:

$$j = \frac{C_1 E^2}{\phi t^2(y)} \exp\left(\frac{C_2 \phi^{1.5} v(y)}{E}\right) \quad (1)$$

where, $C_1$ and $C_2$ are constants, E is the surface electric field that is equal to $\beta V/d$, where $\beta$ is the local field enhancement factor, V is the applied voltage between the electrodes, and d is the gap distance between HV electrode and the ground. Also, $\phi$ is the work function of emitting surface, and $t(y)$ and $v(y)$ are tabulated dimensionless elliptic functions of y which itself is a function of E and $\phi$.

From equation (1), it is found that macroscopic electric field distribution due to the voltage level and gap distance exert less influence on electron emission rate than a local, microscopic field enhancement factor, $\beta$, which is strongly dependent on the surface preparation and conditioning approach. The dependence of $\beta$ upon the microscopic surface condition makes prediction of the level of field emission challenging without experiment.

The rate of electron field-emission from the surface of the cathode can be inferred from the magnitude of stable current drawn from the HV power supply, known as dark current. Prior measurements were completed of dark current for four types of metal (NK-Clean-Z stainless steel. 99.996% class-1 OHFC copper. JIS grade-2 pure titanium. 99.999% molybdenum) at different field strengths. For stainless steel and copper, at about 40-50 MV/m of field strength, the dark current exceeded 1 nA. In contrast, the electric field strength at which dark current exceeds 1 nA for titanium and molybdenum is higher than 100 MV/m. For field strengths below 75 MV/m, the dark current of the titanium and molybdenum was nearly zero. Therefore, molybdenum was selected as the cathode to operate as a +300-kVDC feedthrough and the gap distance was configured to lower a maximum field strength below 75 MV/m (e.g., 3.5 cm or greater).

In the simulation of electron trajectories, the source of electrons was located on the surface of cathode to emit electrons at a rate proportional to the current obtained with the Fowler-Nordheim expression in equation (1). The initial kinetic energy of the electrons was assumed to be 300 keV (the energy due to highest applied voltage) with an initial direction being aligned with the electric field direction. The secondary electron emission yield (SEEY) of MACOR® can be as high as 1.5, however, the scope of the study is limited to incident particles with relatively low energies. To simulate a worst-case scenario, a SEEY of 2 was considered, corresponding to a secondary electron re-emission event activated by each electron hitting the surface of dielectric. The initial velocity of secondary electrons was considered to be dominated by diffuse scattering with the secondary electron speed assumed to be the same as the incident electron speed. This extreme scenario is far from the actual secondary electron yield. Nonetheless, considering an SEEY of 2 provided a feedthrough structure configured to reliably operate without flashover and with limited to no dark current.

Figure 6:
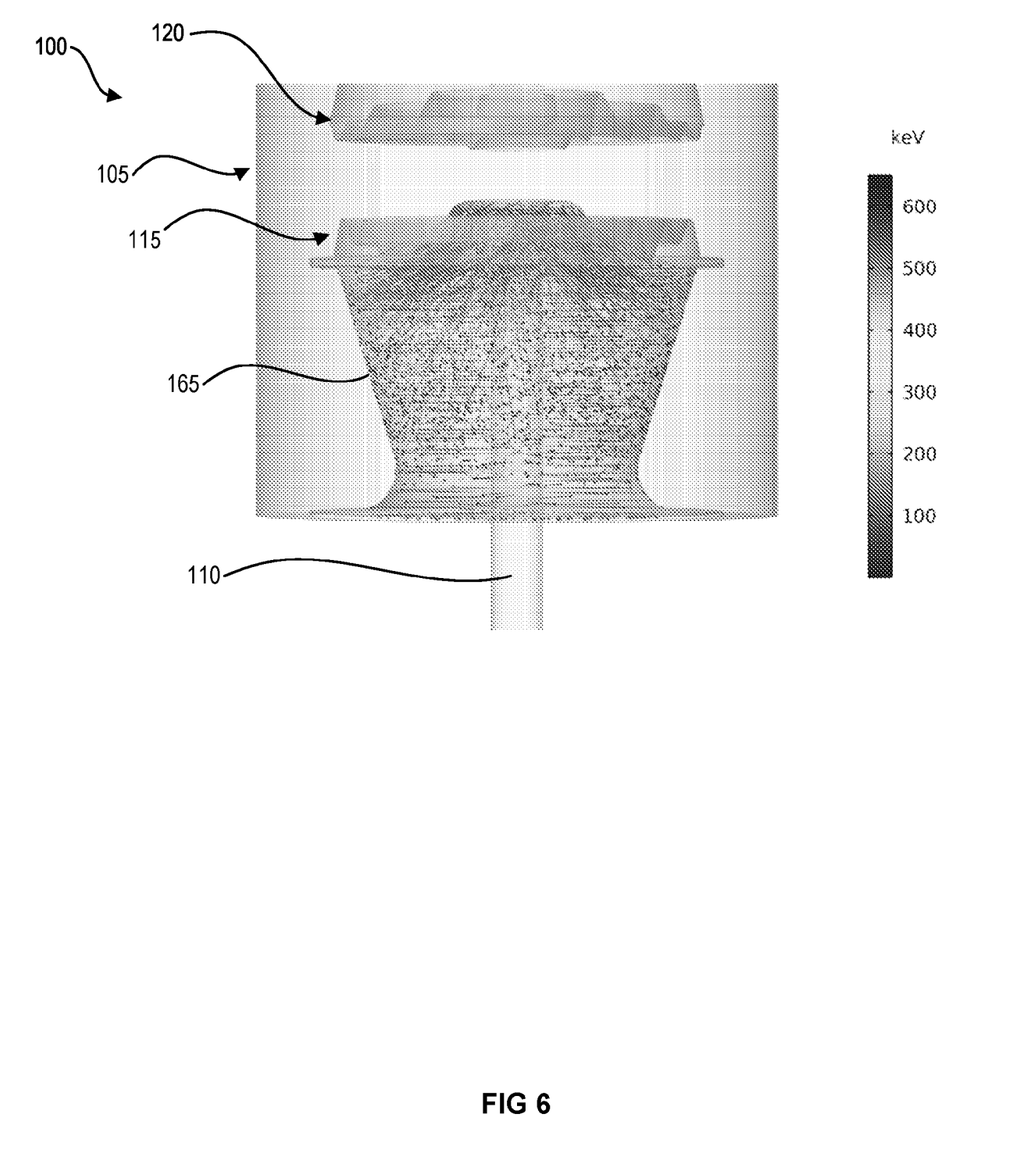
FIG. 6 is a partial schematic diagram illustrating a cross-sectional view of the feedthrough of FIG. 1 with simulated trajectory and energy information for electrons in a vacuum during operation of the feedthrough at about +300 kVDC.
Figure 7:
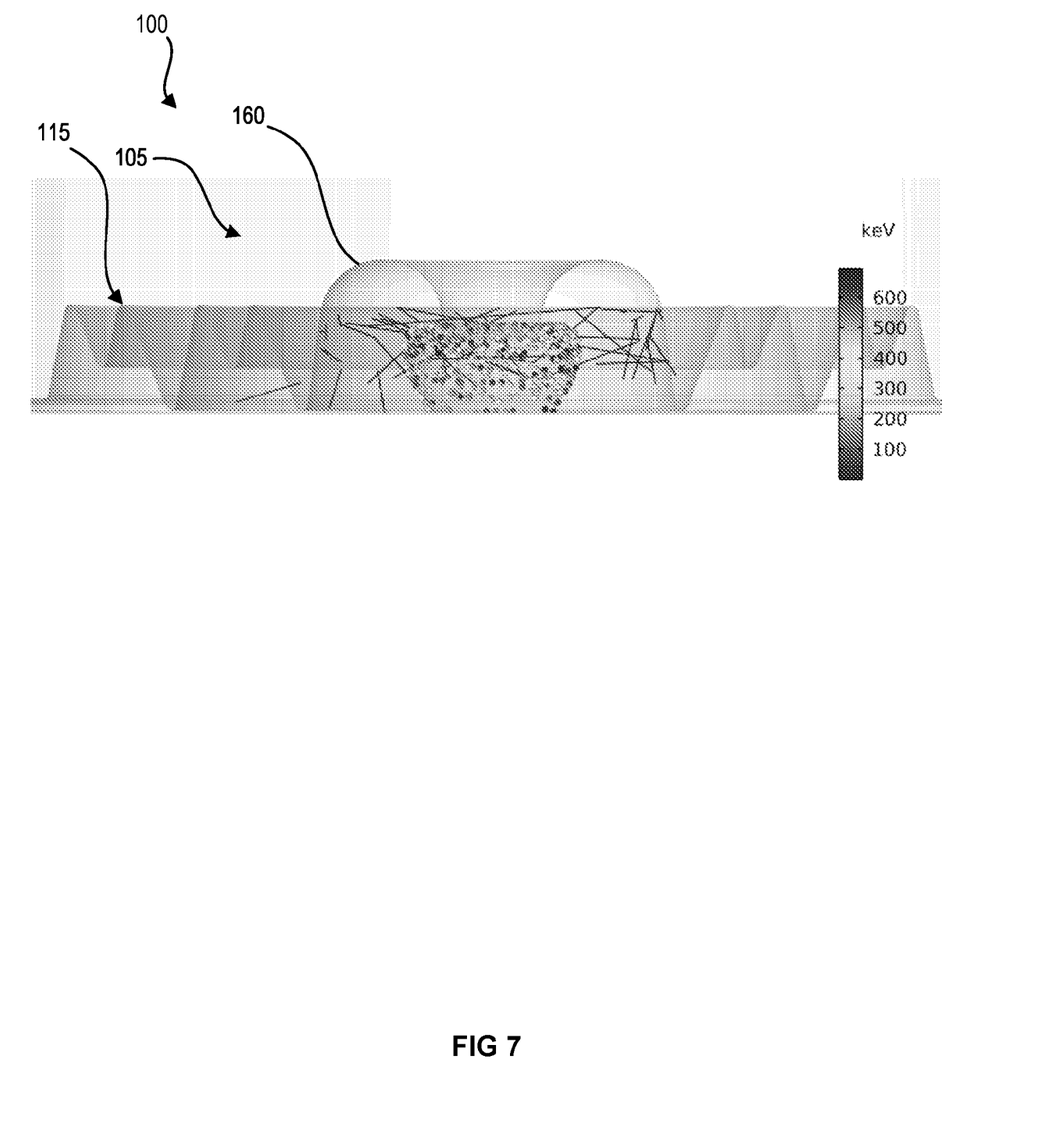
FIG. 7 is a partial schematic diagram illustrating a cross-sectional view of the feedthrough of FIG. 1 with simulated trajectory and energy information for secondary electrons in a vacuum during operation of the feedthrough at about +300 kVDC.

FIG. 6 illustrates simulated trajectories of emitted electrons and secondary electrons. Emission sites of the emitted electrons from the cathode surface are visible. It can also be observed that most of electrons emitted from the cathode impact the anode without eliciting secondary electron reemission across the dielectric surface. The second stage of surface flashover involves electron avalanche across the dielectric surface, which happens when the electrons emitted from cathode impact the surface of the dielectric and secondary electrons re-emitted from the dielectric surface multiply the number of electrons traveling toward the anode. FIG. 7 illustrates a detailed view of the surface of the dielectric flange on the vacuum side and includes trajectories of secondary electrons. As shown, simulation results indicate that many, most, or all of the field-emitted electrons that hit the insulator surface are suppressed by the first wedge of the dielectric sawtooth design. Further, the trajectory of secondary electrons that pass the first wedge is such that the probability of secondary electron generation is low enough to make electron avalanche unlikely or impossible.

CONCLUSION

High voltage electron sources form a critical component of fusion reactors based on electrostatic confinement. Compact feedthrough bushings of the present exemplary embodiments are configured to operate at about +300 kVDC under $p<10^{-8}$ torr without surface flashover and with little or no dark current. Material selection for the cathode reduces dark current and permits for relatively higher electric field strength. Localizing a triple junction point, describing the point of contact of the conductive cathode, the dielectric flange, and the vacuum inside an equipotential well showed improved performance in terms of keeping a rate of electron emission below a rate at which surface flashover becomes probably. The structure of the insulator, including multiple sawtooth wedge features, is configured to operate even at extreme conditions of secondary electron emission with less than 5% of field-emitted electrons hitting the surface of the insulator in the vacuum, and almost all field-emitted electrons are deflected by the first wedge of the sawtooth design.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B . . . " Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A feedthrough, comprising:
   a dielectric flange defining a first side, a second side, and an aperture extending from the first side to the second side; and
   a conductor disposed through the aperture and forming a contact with the dielectric flange on the first side,
   wherein the dielectric flange is characterized by a minimum nondimensional thickness from about 0.1 to about 2.0, expressed as a ratio of a width of the dielectric flange, and wherein the conductor comprises a solid of revolution having a cross-section that is rotationally symmetric about an axis of rotation and defined in part by a compound curve, the compound curve including a first curved segment having a first radius of curvature from about 0.5 mm to about 10 mm.

2. The feedthrough of claim 1, wherein the compound curve further comprises a second curved segment of a second radius of curvature greater than the first radius of the first curved segment, wherein the first curved segment is nearer to the first side and the second curved segment is farther from the first side.

3. The feedthrough of claim 2, wherein the cross-section further comprises a third segment, the first curved segment being between the third segment and the second curved segment, and wherein the third segment is shaped to receive the dielectric flange at the first side and to form the contact.

4. The feedthrough of claim 3, wherein the third segment defines a knife edge concentric with the aperture.

5. The feedthrough of claim 3, wherein the first curved segment meets the third segment at an angle "α" from about 15 degrees to about 345 degrees relative to a radial axis of the dielectric flange normal to the axis of rotation.

6. The feedthrough of claim 1, wherein the compound curve further comprises a second curved segment of a second radius of curvature equal to the first radius of the first curved segment, wherein the first curved segment is nearer to the first side and the second curved segment is farther from the first side.

7. The feedthrough of claim 1, wherein the dielectric flange comprises a solid of revolution defined by a cross-section that is rotationally symmetric about the axis of rotation, and wherein the aperture is concentric with the axis of rotation.

8. The feedthrough of claim 7, wherein the cross-section defines a first segment, substantially normal to the axis of rotation.

9. The feedthrough of claim 8, wherein the first segment further defines a knife edge concentric with the aperture.

10. The feedthrough of claim 8, wherein the cross-section defines an annular recess concentric with the aperture, the annular recess contiguous with the first segment, and wherein the annular recess defines an inner portion with a semi-circular cross-section of radius, "R".

11. The feedthrough of claim 10, wherein the cross-section further defines a feature, contiguous with the annular recess, comprising an inner surface and an outer surface, the inner surface nearer the axis of rotation than the outer surface.

12. The feedthrough of claim 11, wherein the inner surface is oriented relative to the axis of rotation at an angle "β," from about 0 to about 90 degrees.

13. The feedthrough of claim 11, wherein the inner surface is separated from the conductor by a non-dimensional distance from about 0.3 to about 1.0, defined as a ratio of a radius of the dielectric flange.

14. The feedthrough of claim 11, wherein the feature is a first feature, the inner surface is a first inner surface, and the outer surface is a first outer surface, wherein the cross-section further defines a second feature comprising a second inner surface and a second outer surface, wherein the first feature is characterized by a first height, and wherein the second feature is characterized by a second height smaller than the first height.

15. The feedthrough of claim 14, wherein a ratio of the lengths of the first inner surface and the first outer surface is from about 0.1 to about 3.0.

16. The feedthrough of claim 14, wherein a ratio of the lengths of the first inner surface and the second inner surface is from about 0.01 to about 1.0.

17. The feedthrough of claim 14, wherein the feature is a first feature characterized by a first height, and wherein the cross-section further defines a third feature, farther from the axis of rotation than the first feature, the third feature characterized by a third height different from the first height.

18. The feedthrough of claim 17, wherein a difference between the first height and the third height defines an angle "γ" from about −75 degrees to about 75 degrees relative to a radial axis of the dielectric flange normal to the axis of rotation.

19. The feedthrough of claim 18, wherein the cross-section further defines a fourth feature, farther from the axis of rotation than the third feature, the fourth feature characterized by a fourth height different from the first height and the third height, and wherein the fourth height defined relative to the first height and the third height by the angle γ.

20. The feedthrough of claim 11, wherein the feature further comprises a lateral projection positioned between the inner surface and the outer surface, the lateral projection defining an electron entrapment zone adjacent to the inner surface.

21. The feedthrough of claim 1, wherein the dielectric flange comprises a non-porous dielectric material.

22. The feedthrough of claim 1, wherein the dielectric flange comprises aluminum oxide, zirconium dioxide, aluminum nitride, boron nitride, quartz, mica, borosilicate glass, MACOR, or SHAPAL.

23. The feedthrough of claim 1, further comprising a coating of non-conductive or semi-conductive material disposed overlying the first side, the coating being characterized by a secondary electron emission coefficient less than that of the dielectric flange.

24. The feedthrough of claim 1, further comprising a gasket disposed between the dielectric flange and the conductor, wherein the conductor forms the contact with the dielectric flange via the gasket.

25. The feedthrough of claim 24, wherein the gasket is a ring formed from copper, aluminum, flexible graphite, stainless steel, cast steel, monel, inconel, brass, bronze, or any combination thereof.

26. The feedthrough of claim 1, wherein the contact is formed between a metalized surface of the dielectric flange and the conductor, fused by vacuum braising to form a hermetic seal.

27. The feedthrough of claim 1, wherein the conductor comprises molybdenum, titanium, stainless steel, niobium, copper, tungsten, aluminum, nickel, tantalum, or an alloy thereof.

28. The feedthrough of claim 1, wherein the dielectric flange is characterized by a purity greater than about 90%.

* * * * *